Nov. 12, 1940.   W. A. GEOHEGAN   2,221,398
AMPLIFIER
Filed Sept. 8, 1939
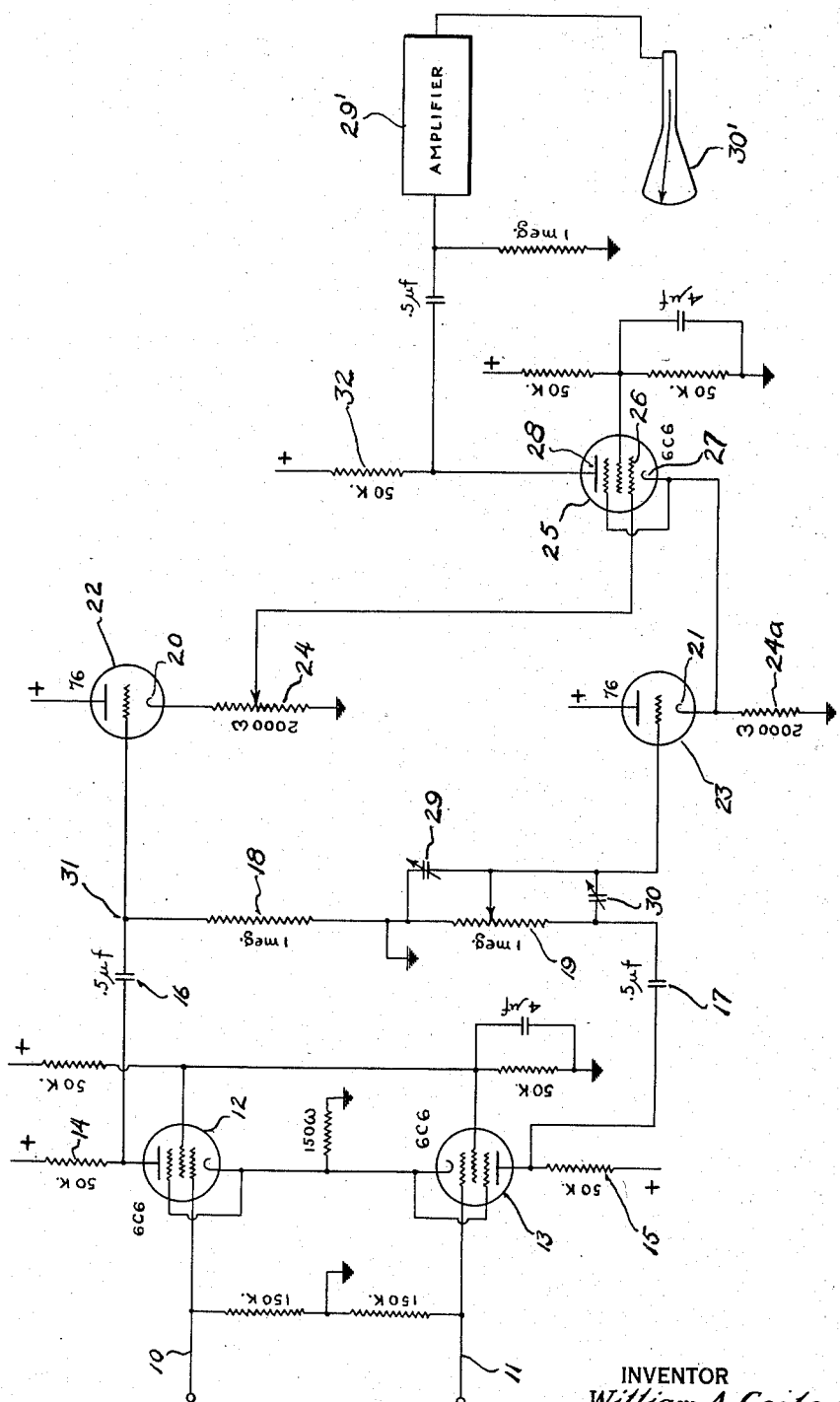
INVENTOR
*William A. Geohegan*
BY
*H. Delaney Gregory*
ATTORNEY Patented Nov. 12, 1940

2,221,398

UNITED STATES PATENT OFFICE 2,221,398

AMPLIFIER

William A. Geohegan, Passaic, N. J., assignor to Allen B. Du Mont Laboratories, Inc., Passaic, N. J., a corporation of New Jersey Application September 8, 1939, Serial No. 294,005

2 Claims. (Cl. 179—171)

My invention relates to improvements in amplifiers.

In the methods and apparatus used heretofore for recording electrocardiograms or other tissue potentials, and which required amplifiers, it has been necessary to shield the patient in order to eliminate stray fields, particularly those due to alternating house current. Also, because of the high gain employed in such apparatus, it has usually been necessary to resort to battery operation, at least of the first amplifier stage, to eliminate ripple from the power supply. Differential amplifiers have been proposed using battery supplies both above and below ground, in order to avoid the use of an alternating-current supply. A. C. operation of these differential amplifiers would require the use of two variable-voltage power supplies, and in any event they do not provide for cancellation of the ripple from the power supplies.

With the foregoing in mind, it is an object of my invention to provide an improved amplifier of the character referred to which is adapted particularly for the recording of electrocardiograms or other tissue potentials, which may be operated from a single rectified A. C. power supply, which results in good recording even in the presence of stray fields many times the strength of the signal to be recorded, and which will cancel stray signals appearing simultaneously on its two input terminals and will also cancel power-supply ripple to the first stage, but which will amplify potentialg differences between its two input leads.

Other objects and advantages will hereinafter appear.

For the purpose of illustrating my invention, an embodiment thereof is shown in the drawing, which is a simplified, diagrammatic showing of an amplifier constructed and operating in accordance with my invention.

In using my improved amplifier for the recording of electrocardiograms or other tissue potentials, for example, the usual leads from the patient are connected to the input terminals 10 and 11, respectively.

The tubes 12 and 13 comprise a balanced push-pull input stage, and are of the same type. Resistors 14 and 15 are of the same resistance, and the capacities of condensers 16 and 17 are the same. The resistance of resistor 18 is the same as that of resistance 19.

Assuming resistance 19 to be set at full value, any signal, such as that from a stray field, appearing identically on the two input terminals 10 and 11, will be amplified by the tubes 12 and 13 and will appear at the respective cathodes 20 and 21 of the tubes 22 and 23 in the same amplitude and phase.

Assuming resistor 24 to be set at full value, the tube 25 will be modulated on its grid 26 from the tube 22, and will be modulated on both its cathode 27 and its plate 28 from the tube 23, the modulation in both cases being by the same signal. Therefore, if the control resistance 19 be reduced by the proper amount and if the phase shift be corrected by adjustment of the variable condensers 29 and 30, no signal will appear at the plate 28 of tube 25. Power-supply ripple on tubes 12, 13, 22 and 23 will cancel in the same manner. Actually, it may be desirable to adjust resistance 24 to obtain the desired D. C. bias on tube 25. In such case, a small part of the ripple on the plates of tubes 22 and 23 may appear on the input of tube 25.

In the operation of my improved amplifier, a difference in potential between the input terminals 10 and 11 will be amplified by tubes 12 and 13 and will appear on the respective cathodes 20 and 21 of the tubes 22 and 23 in opposite phase. It will therefore be further amplified by tube 25. Thus, the desired signal appearing between the input terminals 10 and 11 will be amplified, while the stray field and power-supply ripple will be cancelled.

With regard to the coupling tube 23 producing a signal between the plate 28 and the cathode 27 of tube 25, it will be found that the plate-to-cathode voltage of tube 25 is equal to the supply voltage minus the drop across resistor 32, minus the drop across resistor 24a. In other words, the plate-to-cathode voltage of tube 25 is equal to the voltage from its plate to ground minus the voltage from its cathode to ground. Therefore, a signal placed on the cathode 27 of tube 25 by the tube 23 affects both the plate-to-cathode voltage and the grid-to-cathode voltage of tube 25.

The output signal from tube 25 may be amplified in an amplifier 29' and then applied to suitable recording mechanism or to an oscillograph which may in the form of a cathode-ray tube 30', as represented.

From the foregoing, it will be seen that in my improved method, differences in electrical potential between two points are amplified by utilizing for such purpose a balanced push-pull input stage such as that comprised of the tubes 12 and 13, and by utilizing a single-ended output stage such as that comprised of the tube 25 by applying the potential differences between the input terminals of the input stage, such as the terminals 10 and 11, by utilizing cathode-loaded tubes, such as the tubes 22 and 23, to couple the input stage to the output stage, by utilizing the output signal from a tube of the coupling stage to modulate the single tube of the output stage on only the grid thereof, and by utilizing the output signal from another tube of the coupling stage to modulate the single tube of the output stage on both the cathode and plate thereof.

As a modification, the tube 22 may be omitted, and the connection made direct from the point 31 to the grid 26 of tube 25.

The tubes 22 and 23 may be triodes of conventional construction, and for best results they should be matched.

The value of resistors 24, 24a and 32, and the types of tubes 22, 23 and 25, should be so chosen that these tubes are within their respective operating ranges.

The scope of the claims is intended to be such as to cover an embodiment of my invention whether or not the elements of 12 and 13 are in separate envelopes as represented, or actually are in a single container, in which case there need be only a single, common cathode lead. This also applies to tubes 22 and 23, but here there would be the separate cathodes 20 and 21. Still further, the use of the term "tube" in the claims is intended to embrace a unit or group of elements such as a cathode, grid and plate, and to include a construction wherein two or more of such units or groups of elements are contained in a single envelope. For example, the two, type 76 tubes 22 and 23, could be replaced by one, type 6C8G tube.

Desirable types of tubes have been suggested by the trade designations shown. Also, there have been designated the various values of resistance and capacity which have given satisfactory results.

Although my improved amplifier has been described more in connection with the recording of electrocardiograms or other tissue potentials, it will be understood that its use is not limited to this field.

It will be understood, also, that modifications within the conception of those skilled in the art are possible without departing from the spirit of my invention or the scope of the claims.

I claim as my invention:

1. In an amplifier of differences in electrical potential between two points, a balance input stage having input terminals between which the potential differences may be applied, a single-ended output stage, means for applying the output signal from a tube of said input stage to the grid-circuit only of the single tube of said output stage, and means for applying the output signal from another tube of said input stage to both the cathode-circuit and the plate-circuit of the single tube of said output stage.

2. In an amplifier of differences in electrical potential between two points, a balanced input stage having input terminals between which the potential differences may be applied, a single-ended output stage, and cathode-loaded tubes coupling said input stage to said output stage, one of the coupling tubes operating to change the potential of only the grid of the single tube of said output stage, another of the coupling tubes operating to change the potential of both the cathode and plate of the single tube of said output stage.

WILLIAM A. GEOHEGAN.